US011076022B2

United States Patent
Pandya et al.

(10) Patent No.: US 11,076,022 B2
(45) Date of Patent: Jul. 27, 2021

(54) SYSTEMS AND METHODS FOR IMPLEMENTING ROBOTICS FRAMEWORKS

(71) Applicant: Lyft, Inc., San Francisco, CA (US)

(72) Inventors: Tirthkumar Nilaykumar Pandya, Foster City, CA (US); Siliang Li, Pittsburgh, PA (US); Jonathan Nichols, San Francisco, CA (US)

(73) Assignee: Lyft, Inc., San Francisco, CA (US)

(*) Notice: Subject to any disclaimer, the term of this patent is extended or adjusted under 35 U.S.C. 154(b) by 0 days.

(21) Appl. No.: 16/237,351

(22) Filed: Dec. 31, 2018

(65) Prior Publication Data
US 2020/0213422 A1 Jul. 2, 2020

(51) Int. Cl.
| H04L 29/06 | (2006.01) |
| G06F 9/54 | (2006.01) |
| H04L 29/08 | (2006.01) |
| G06F 30/20 | (2020.01) |

(52) U.S. Cl.
CPC .......... *H04L 67/40* (2013.01); *G06F 9/547* (2013.01); *G06F 30/20* (2020.01); *H04L 63/0236* (2013.01); *H04L 67/12* (2013.01)

(58) Field of Classification Search
CPC ..... H04L 67/40; H04L 63/0236; H04L 67/12; G06F 30/20; G06F 9/547
See application file for complete search history.

(56) References Cited

U.S. PATENT DOCUMENTS

| 6,742,177 B1* | 5/2004 | Dorak, Jr. ............ G06F 11/362 714/E11.207 |
| 7,124,207 B1* | 10/2006 | Lee .......................... G06F 13/24 710/5 |
| 10,127,091 B1* | 11/2018 | MacNeil ................. G06F 9/545 |
| 2003/0095514 A1* | 5/2003 | Sabe ...................... H04L 69/329 370/328 |
| 2004/0158640 A1* | 8/2004 | Philbrick ................ H04L 69/10 709/230 |
| 2005/0108571 A1* | 5/2005 | Lu ....................... H04L 63/0853 726/4 |
| 2008/0198804 A1* | 8/2008 | Rahman ............ H04W 36/0011 370/331 |
| 2009/0260023 A1* | 10/2009 | Murthy ................. G06F 9/5027 719/330 |
| 2011/0041143 A1* | 2/2011 | Accapadi .............. G06F 11/302 719/321 |

(Continued)

Primary Examiner — William G Trost, IV
Assistant Examiner — Abdelbasst Talioua
(74) Attorney, Agent, or Firm — Sheppard Mullin Richter & Hampton LLP

(57) ABSTRACT

Systems, methods, and non-transitory computer-readable media can initiate a robotics framework configured to enable inter-process communications between a plurality of services implemented on the robotics framework, the plurality of services configured to operate at least some features of a vehicle. A function call is received from a first service of the plurality of services. The function call instructs the robotics framework to generate a network socket. A virtual network socket configured to receive data from a data log is generated based on the function call. The virtual network socket simulates data transmission with a hardware device over a real network socket.

20 Claims, 9 Drawing Sheets

(56) References Cited

U.S. PATENT DOCUMENTS

| | | | | |
|---|---|---|---|---|
| 2012/0072548 A1* | 3/2012 | Kim | ........................ | H04L 67/02 |
| | | | | 709/219 |
| 2012/0072891 A1* | 3/2012 | Hewitt | ...................... | G06F 8/43 |
| | | | | 717/143 |
| 2013/0055287 A1* | 2/2013 | Pope | ....................... | G06F 9/546 |
| | | | | 719/314 |
| 2013/0100810 A1* | 4/2013 | Slothouber | ............ | H04L 43/062 |
| | | | | 370/235 |
| 2014/0055470 A1* | 2/2014 | Diard | ........................ | G06F 9/44 |
| | | | | 345/520 |
| 2016/0112262 A1* | 4/2016 | Johnson | .............. | H04L 61/1511 |
| | | | | 709/221 |
| 2016/0119374 A1* | 4/2016 | Williams | .............. | H04L 63/166 |
| | | | | 713/175 |
| 2016/0132346 A1* | 5/2016 | Diard | ........................ | G06T 1/20 |
| | | | | 345/522 |
| 2016/0283413 A1* | 9/2016 | Siva | ....................... | G06F 13/105 |
| 2016/0342146 A1* | 11/2016 | Rencs | ................ | G05B 19/0421 |
| 2017/0262301 A1* | 9/2017 | Bai | ........................ | G06F 9/4411 |
| 2018/0011751 A1* | 1/2018 | Klein | ..................... | H04L 67/10 |
| 2018/0183873 A1* | 6/2018 | Wang | ...................... | H04L 67/02 |
| 2018/0225230 A1* | 8/2018 | Litichever | ............... | G06F 21/82 |
| 2018/0232266 A1* | 8/2018 | Ikeda | ...................... | G06F 9/546 |
| 2018/0295134 A1* | 10/2018 | Gupta | .................... | H04L 67/28 |
| 2019/0004510 A1* | 1/2019 | Xiao | .................... | G05D 1/0022 |
| 2019/0158536 A1* | 5/2019 | Kraemer | ............... | H04L 63/168 |
| 2019/0303759 A1* | 10/2019 | Farabet | ................ | G06K 9/4628 |
| 2019/0332553 A1* | 10/2019 | Tertzakian | ............ | G06F 13/102 |

\* cited by examiner

500

┌─────────────────────────────────────────────────────────────┐
│ Initiate a robotics framework configured to enable inter-process │
│ communications between a plurality of services implemented on the │
│ robotics framework, the plurality of services configured to operate at least │
│ some features of a vehicle │
│ 502 │
└─────────────────────────────────────────────────────────────┘
                              │
                              ▼
┌─────────────────────────────────────────────────────────────┐
│ Receive a function call from a first service of the plurality of services │
│ instructing the robotics framework to generate a network socket │
│ 504 │
└─────────────────────────────────────────────────────────────┘
                              │
                              ▼
┌─────────────────────────────────────────────────────────────┐
│ Generate a network socket configured to receive data from a data source │
│ based on the function call │
│ 506 │
└─────────────────────────────────────────────────────────────┘

FIGURE 5

SYSTEMS AND METHODS FOR IMPLEMENTING ROBOTICS FRAMEWORKS

FIELD OF THE INVENTION

The present technology relates to robotics frameworks. More particularly, various embodiments of the present technology relate to systems, apparatus, and methods for implementing robotics frameworks that may be utilized in autonomous, semi-autonomous, or manually driven vehicles.

BACKGROUND

Vehicles are increasingly being equipped with intelligent features that allow them to monitor their surroundings and make informed decisions on how to react. Such vehicles, whether autonomously, semi-autonomously, or manually driven, may be capable of sensing their environment and navigating with little or no human input as appropriate. The vehicle may include a variety of systems and subsystems for enabling the vehicle to determine its surroundings so that it may safely navigate to target destinations or assist a human driver, if one is present, with doing the same. As one example, the vehicle may have a computing system (e.g., one or more central processing units, graphical processing units, memory, storage, etc.) for controlling various operations of the vehicle, such as driving and navigating. To that end, the computing system may process data from one or more sensors. For example, a vehicle may have sensors that can recognize hazards, roads, lane markings, traffic signals, and the like. Data from sensors may be used to, for example, safely drive the vehicle, activate certain safety features (e.g., automatic braking), and generate alerts about potential hazards.

SUMMARY

Various embodiments of the present technology can include systems, methods, and non-transitory computer readable media configured to initiate a robotics framework configured to enable inter-process communications between a plurality of services implemented on the robotics framework, the plurality of services configured to operate at least some features of a vehicle. A function call is received from a first service of the plurality of services. The function call instructs the robotics framework to generate a network socket. A virtual network socket configured to receive data from a data log is generated based on the function call. The virtual network socket simulates data transmission with a hardware device over a real network socket.

In an embodiment, the function call comprises a first IP address and a first port.

In an embodiment, the data log comprises a plurality of data transmissions from one or more sensors on a vehicle.

In an embodiment, each data transmission in the plurality of data transmissions is associated with an IP address and a port.

In an embodiment, a first data transmission associated with the first IP address and the first port is identified in the data log. The first data transmission is provided to the first service via the robotics framework based on the first data transmission being associated with the first IP address and the first port.

In an embodiment, the function call identifies a first callback function to be utilized by the robotics framework to provide data to the first service, and the first data transmission is provided to the first service using the first callback function.

In an embodiment, the virtual network socket is generated instead of a real network socket based on a determination that the robotics framework is in a test mode.

In an embodiment, a second function call is received from a second service of the plurality of services instructing the robotics framework to generate a second network socket. A real network socket is generated connecting the robotics framework to a hardware device based on the second function call.

In an embodiment, a first set of data is received from the hardware device using the network socket. A first callback function identified in the function call is utilized to provide, via the robotics framework, the first set of data to the first service.

In an embodiment, the real network socket is generated instead of a virtual network socket based on a determination that the robotics framework is not in a test mode.

It should be appreciated that many other features, applications, embodiments, and variations of the disclosed technology will be apparent from the accompanying drawings and from the following detailed description. Additional and alternative implementations of the structures, systems, non-transitory computer readable media, and methods described herein can be employed without departing from the principles of the disclosed technology.

BRIEF DESCRIPTION OF THE DRAWINGS

FIG. 5 illustrates an example method, according to an embodiment of the present technology.

Figure 1A:
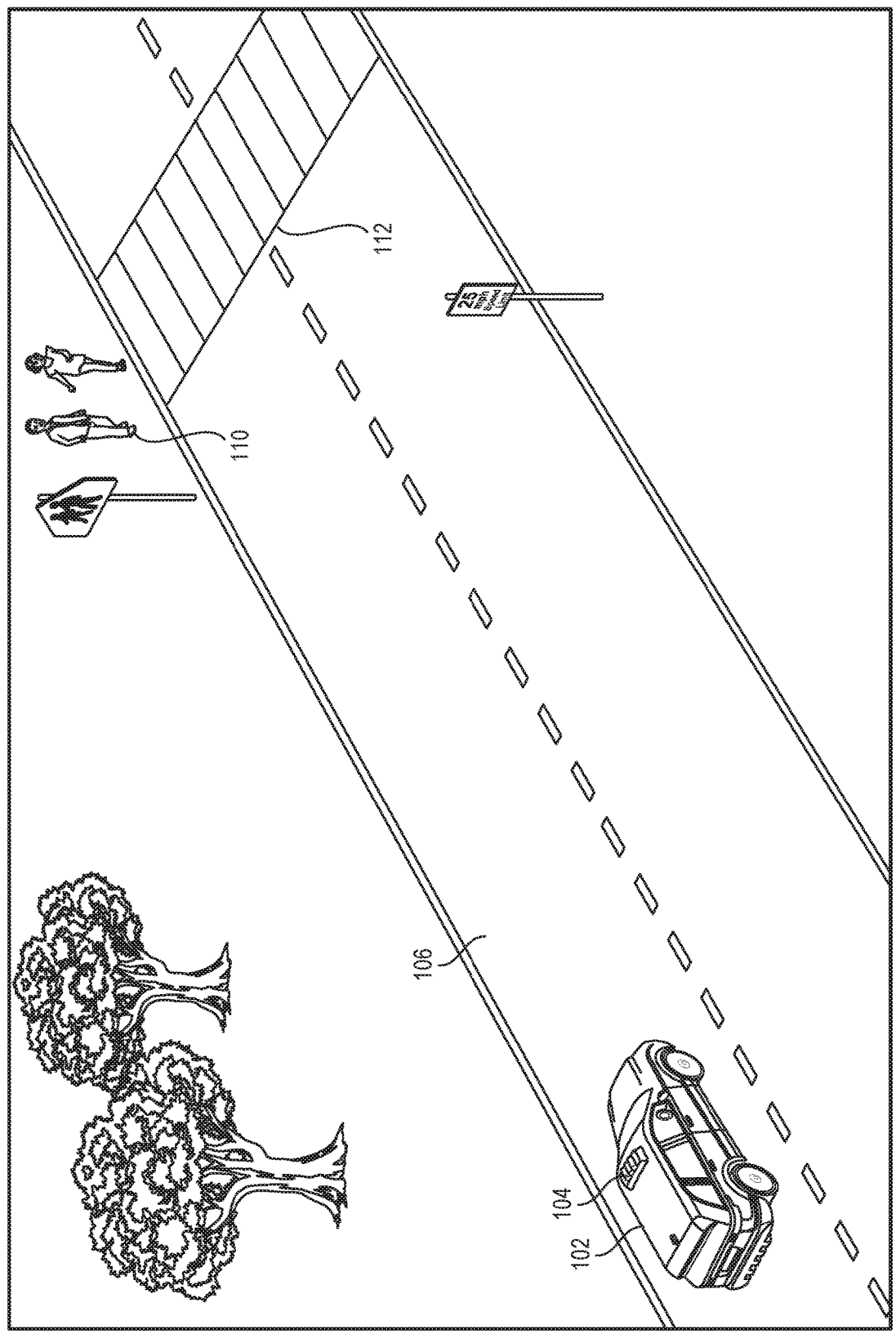
FIG. 1A illustrates an example scenario demonstrating various challenges that may be experienced when utilizing conventional robotics frameworks.

The figures depict various embodiments of the disclosed technology for purposes of illustration only, wherein the figures use like reference numerals to identify like elements. One skilled in the art will readily recognize from the following discussion that alternative embodiments of the structures and methods illustrated in the figures can be employed without departing from the principles of the disclosed technology described herein.

DETAILED DESCRIPTION

Vehicles are increasingly being equipped with intelligent features that allow them to monitor their surroundings and make informed decisions on how to react. Such vehicles, whether autonomously, semi-autonomously, or manually driven, may be capable of sensing their environment and navigating with little or no human input. The vehicle may include a variety of systems and subsystems for enabling the vehicle to determine its surroundings so that it may safely navigate to target destinations or assist a human driver, if one is present, with doing the same. As one example, the vehicle may have a computing system for controlling various operations of the vehicle, such as driving and navigating. To that end, the computing system may process data from one or more sensors. For example, a vehicle may have one or more sensors or sensor systems that can recognize hazards, roads, lane markings, traffic signals, etc. Data from sensors may be used to, for example, safely drive the vehicle, activate certain safety features (e.g., automatic braking), and generate alerts about potential hazards.

Figure 1B:
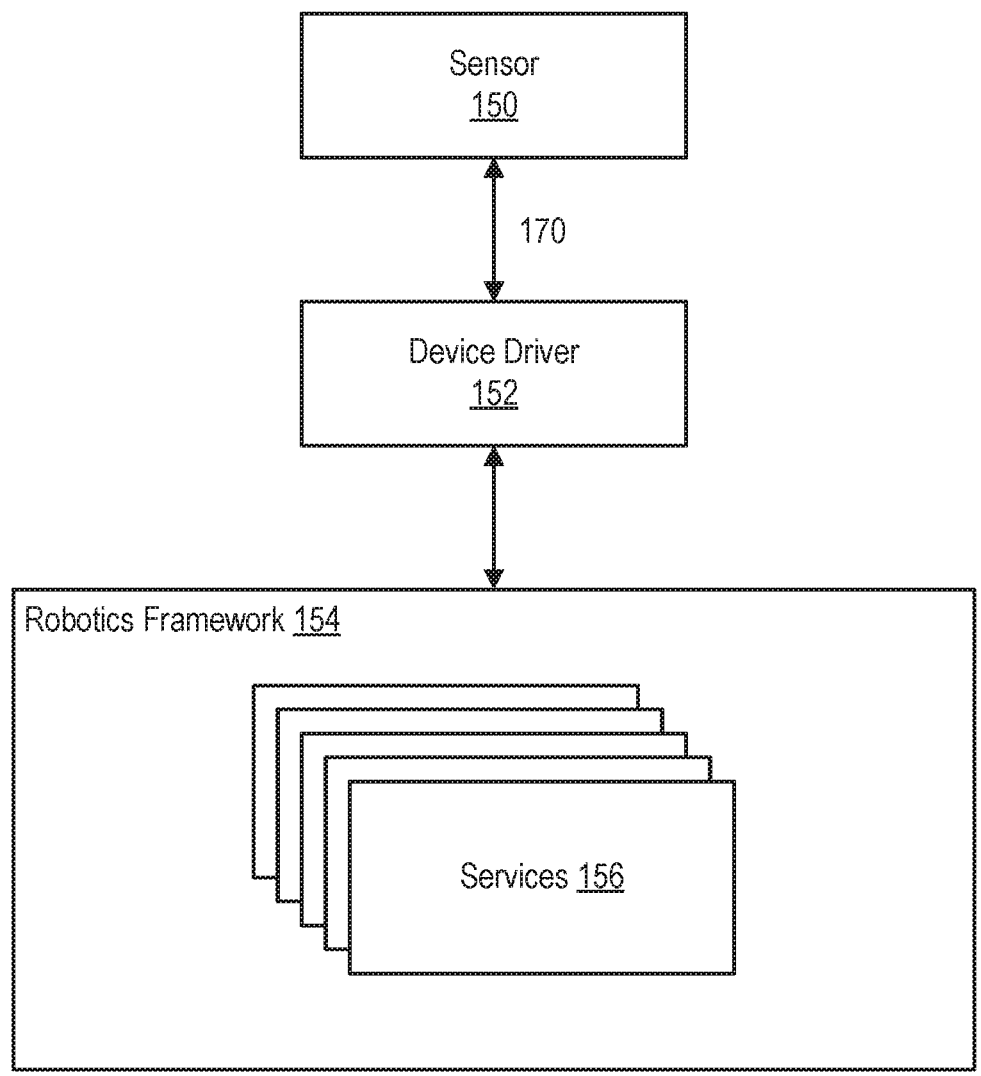
FIG. 1B illustrates various challenges that may be experienced when utilizing conventional robotics frameworks.

In general, a vehicle can utilize a robotics framework for a variety of different platforms (e.g., automobiles, drones, unmanned vehicles, etc.) to receive data from various sensors and to make various determinations or take certain actions based on the data from the various sensors. Examples of existing robotics frameworks include the Robot Operating System (ROS) framework, other robotics frameworks that are built as an extension of ROS, and the Apollo robotics framework. However, conventional robotics frameworks pose disadvantages. FIGS. 1A and 1B illustrate example scenarios that are illustrative of various challenges that may be experienced using conventional approaches. In FIG. 1A, a vehicle 102 includes a sensor suite 104 and is driving down a road 106. The vehicle 102 may be an autonomous, semi-autonomous, or manually-driven vehicle. As the vehicle 102 drives down the road 106, one or more sensors in the sensor suite 104 may receive data. A robotics framework implemented on the vehicle 102 may be configured to receive data from the one or more sensors. Furthermore, various services (or processes) implemented on the robotics framework may be configured to make various determinations or take certain actions based on the data. For example, the one or more sensors may include a camera. Image data from the camera may be provided to a first service implemented on a robotics framework in order to identify objects around the vehicle 102 based on the image data. For example, in the example scenario shown in FIG. 1A, the first service may analyze image data to recognize a crosswalk 112 and pedestrians 110. Information from the first service may then be provided to a second service implemented on the robotics framework that is configured to cause the vehicle 102 to take certain actions based on the identified objects. For example, the second service can cause the car to come to a stop based on the identification of the crosswalk 112 and the pedestrians 110.

FIG. 1B provides a functional block diagram representation of a conventional vehicle system that illustrates communications between various components in a vehicle. In the conventional implementation depicted in FIG. 1B, a hardware sensor 150 may communicate with a device driver 152, and the device driver may communicate and/or exchange data with one or more services 156 implemented on a robotics framework 154. The connection between the sensor 150 and the device driver 152, indicated by a bi-directional arrow 170, may occur over a network, and may utilize network protocols, such as TCP and/or UDP. In conventional approaches, the connection 170 between the sensor 150 and the device driver 152 may be outside the scope and/or purview of the robotics framework 154. In such implementations, the device driver 152 typically includes specific commands for opening a network socket between the hardware sensor 150 and the device driver 152, reading from the network socket, and/or writing to the network socket. As such, device drivers 152 in conventional systems are often reliant on an actual connection to a hardware device, such as the sensor 150, and typically require the physical presence of a hardware device to connect to. Such an implementation makes it very difficult to test and debug in-vehicle services (e.g., services 156) that communicate with network sockets in isolation because there is a strong dependency on the actual hardware to be physically present. This leads to the additional cost of using test benches with actual hardware for testing, and extra time for setting up and maintaining such test benches. Furthermore, because the connection 170 between the sensor 150 and the device driver 152 is not maintained by the robotics framework 154, raw network frames transmitted between the sensor 150 and the device driver 152 may not be logged in a structured way end-to-end, which makes it difficult to debug services implemented on the robotics framework 154 which rely on inputs from hardware devices. Conventional approaches thus pose disadvantages.

Figure 2:
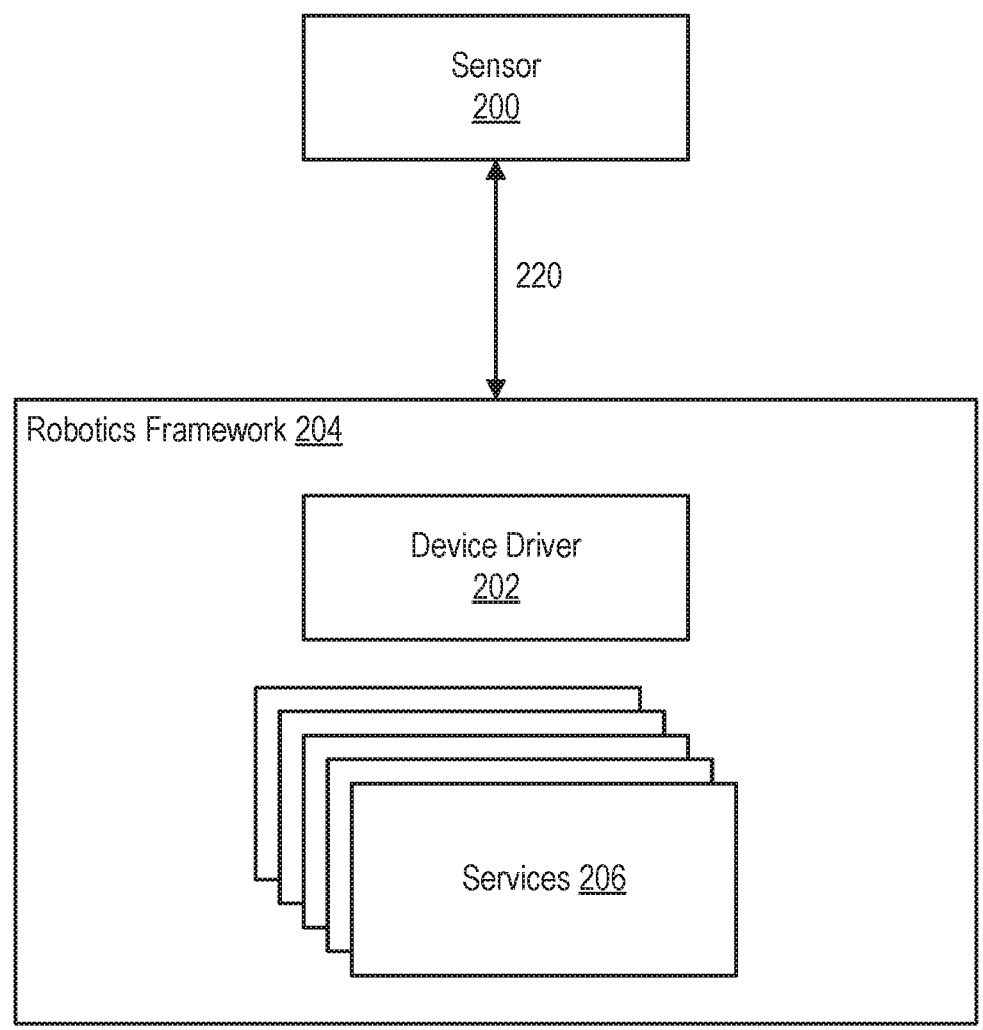
FIG. 2 illustrates an example functional block diagram, according to an embodiment of the present technology.

An improved approach in accordance with the present technology overcomes the foregoing and other disadvantages associated with conventional approaches. In relation to the present technology, a robotics framework can be implemented which itself manages all network connections (i.e., network sockets) with hardware components. The robotics framework can act as a go-between between services implemented on the robotics framework and one or more hardware devices. For example, the robotics framework can be configured to manage network connections between device drivers implemented on the robotics framework and hardware devices, such as sensors on a vehicle. As such, device drivers are no longer tasked with managing network connections with hardware devices and, instead, rely on the robotics framework to create network connections and manage data transmissions over those network connections. An example configuration is demonstrated in FIG. 2. In FIG. 2, a device driver 202 may be configured to receive input data from a hardware sensor 200. For example, the device driver 202 may be configured to receive raw network packets from the hardware sensor 200 (e.g., UDP packets and/or TCP packets), and convert them into an output format. In a more particular example, the device driver 202 may be a device driver for a camera, and may be configured to convert raw network packets from the camera into an image. Or, as another example, the device driver 202 may be a device driver for a lidar system, and may be configured to convert raw network packets from the lidar system into a point cloud. In the depicted configuration, the device driver 202 is implemented as a service within a robotics framework 204. The device driver 202 may be one of many services 206 implemented on the robotics framework 204. The robotics framework 204 can be configured to enable inter-process communications between services (i.e., processes) implemented on the robotics framework 204, such as the device driver 202 and one or more other services 206. In other words, the robotics framework 204 can be configured to provide a framework within which various services implemented on the framework can exchange data with one another.

In the conventional approach depicted in FIG. 1B, a device driver 152 managed a direct network connection between itself and a hardware sensor 150. The device driver 152 was tasked with opening the network connection 170, reading data from the network connection 170, and/or writing data to the network connection 170. However, in the configuration shown in FIG. 2, rather than directly connecting the device driver 202 and the sensor 200, the robotics framework 204 is connected to the hardware sensor 200 over a network connection 220. The network connection 220 may be implemented using a network socket, such as, for example, a UDP socket and/or a TCP socket. The robotics framework 204 can be tasked with managing the network connection 220, including opening the network connection 220, reading data from the network connection 220, and/or writing data to the network connection 220. In certain embodiments, the device driver 202 can send a request or instruction to the robotics framework 204 to open a network connection to communicate with the sensor 200. The robotics framework 204 can, in response to the request from the device driver 202, open the network connection 220. Furthermore, the robotics framework 204 can perform the tasks of reading data from the network connection and/or or writing data to the network connection. When data is received over the network connection (e.g., TCP and/or UDP packets from the sensor 200), the robotics framework 204 can provide that data to the device driver 202.

In the configuration shown in FIG. 2, the device driver 202 is no longer dependent on an actual connection to a physical hardware device. Rather, the device driver 202 is coded to instruct the robotics framework 204 to connect to a hardware device. The device driver 202 then relies on the robotics framework 204 to manage the connection and relies on the robotics framework 204 to provide any data that may be received from the hardware device. In various embodiments, the robotics framework 204 can be configured to create virtual network sockets that are not connected to an actual hardware device, but simulate data transmissions to and/or from a hardware device. Various example configurations utilizing actual network sockets and virtual network sockets are demonstrated in FIGS. 4A and 4B, and described in greater detail herein. The robotics framework 204 can be configured to inject data into virtual network sockets that simulate data received from a hardware device. The simulated or injected data can be provided to the device driver 202 by the robotics framework 204. From the perspective of the device driver 202, the simulated or injected data appears to be coming from an actual hardware device. Furthermore, because the robotics framework 204 is managing network connections between services and hardware devices, the robotics framework 204 can be configured to perform automatic logging of all data transmitted to/from hardware devices. Automatically logged data can then be used later on as virtual or simulated inputs to a virtual network socket. More details relating to the present technology are provided below. Although various example implementations will be described herein with reference to a robotics system implemented on a vehicle, it should be understood that the present technologies are not limited to vehicles, and can be applied to any robotics system in a broad range of technologies.

Figure 3:
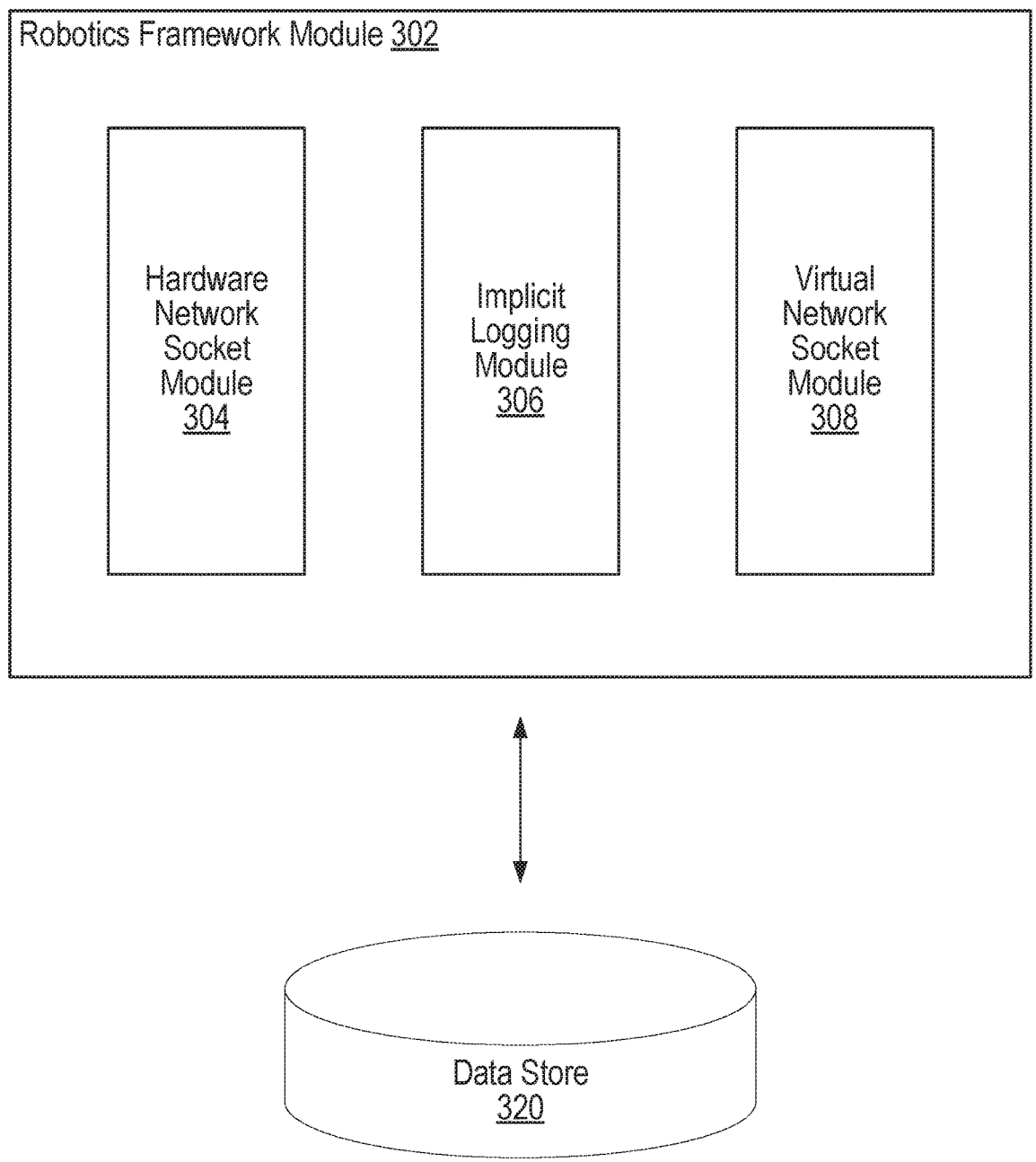
FIG. 3 illustrates an example robotics framework module, according to an embodiment of the present technology.

FIG. 3 illustrates an example system 300 including an example robotics framework module 302, according to an embodiment of the present technology. In some embodiments, the robotics framework module 302 can implement functionality of the robotics framework 204. As shown in the example of FIG. 3, the robotics framework module 302 can include a hardware network socket module 304, an implicit logging module 306, and a virtual network socket module 308. In some instances, the example system 300 can include at least one data store 320. The components (e.g., modules, elements, etc.) shown in this figure and all figures herein are exemplary only, and other implementations may include additional, fewer, integrated, or different components. Some components may not be shown so as not to obscure relevant details. In some embodiments, some or all of the functionality performed by the robotics framework module 302 and its sub-modules may be performed by one or more backend computing systems, such as a transportation management system 660 of FIG. 6. In some embodiments, some or all of the functionality performed by the robotics framework module 302 and its sub-modules may be performed by one or more computing systems implemented in a vehicle, such as a vehicle 640 of FIG. 6.

The robotics framework module 302 can be configured to communicate and operate with the at least one data store 320, as shown in the example system 300. The at least one data store 320 can be configured to store and maintain various types of data. For example, the data store 320 can store a robotics framework, one or more services implemented on the robotics framework, including one or more device drivers implemented on the robotics framework, one or more data logs with logged sensor data, and the like. In some embodiments, some or all data stored in the data store 320 can be stored by the transportation management system 660 of FIG. 6. In some embodiments, some or all data stored in the data store 320 can be stored by the vehicle 640 of FIG. 6. More details about information that can be stored in the data store 320 are provided below.

The hardware network socket module 304 can be configured to create and manage network connections between a robotics framework and a hardware device, such as a sensor on a vehicle. An example configuration in which a robotics framework is connected to a hardware device using a real network socket is demonstrated in FIG. 4A. The hardware network socket module 304 can be configured to receive an instruction to create a network connection (i.e., a network socket) connecting the robotics framework and a hardware component on a network. The instruction may be provided by a service implemented on the robotics framework. For example, the instruction may be provided by a device driver implemented on the robotics framework. The instruction may specify a particular hardware component on a network for the robotics framework to connect to. For example, the instruction may specify an IP address and a port. The IP address and the port may be associated with a particular hardware device (e.g., a particular sensor).

An example instruction (e.g., an example function call) from a service to the robotics framework may read as follows: createUDPSocket(IP address, port, [read_lidar1, write_lidar1], callback_function). The example instruction is an instruction from a service to the robotics framework instructing the robotics framework to create a UDP socket between the robotics framework and a component on a network. Although this example uses a UDP socket, it should be understood that the instruction can be an instruction to create any kind of network connection, such as a TCP socket, and the like. The example instruction includes an IP address field, which specifies an IP address, and a port field, which specifies a port. The IP address and the port may be associated with a particular hardware component, such as a particular hardware sensor.

The example instruction also includes a callback function field ("callback_function"). As mentioned above, the instruction to create the network connection may have come from a service, such as a device driver. The callback function field may be associated with the service that requested the network connection. The robotics framework (e.g., using the hardware network socket module 304) can use the callback function to inform the service that data has been received over the network connection, and to provide the service with the received data. For example, if a first device driver instructs a robotics framework to generate a first network connection, and the robotics framework (e.g., the hardware network socket module 304) receives a first set of data over the first network connection, the robotics framework can utilize the callback function to provide the first device driver with the first set of data.

The example instruction also includes a listing of topics: [read_lidar1, write_lidar1]. The listing of topics may specify particular types of data that a service would like to receive over the requested network connection. For example, consider once again the example scenario of a first device driver instructing a robotics framework to generate a first network connection. One or more topics specified in the instruction (e.g., function call) to the robotics framework may define types of data that the first device driver would like to receive from the first network connection. For example, if the listing of topics identifies the topics "read_lidar1" and "write_lidar1," the first device driver is requesting all data that has been tagged with the topics "read_lidar1" and/or "write_lidar1." If the robotics framework receives, via the first network connection, a first set of data that is tagged with one of these two topics, the robotics framework can use the callback function to provide the first set of data to the first device driver. However, if the first set of data is not tagged with one of these two topics, the robotics framework may not provide the first set of data to the first device driver.

The implicit logging module 306 can be configured to perform automatic logging of data transmissions transmitted over a network connection managed by a robotics framework. As discussed above, the hardware network socket module 304 can be configured to create and manage network connections between a robotics framework and hardware devices on a network. For all data transmitted over a network connection between a robotics framework and a hardware device, the implicit logging module 306 can be configured to store the data in a data log along with other structured information pertaining to the data. Structured information pertaining to a set of data can include, for example, an IP address, a port, and a topic. For example, consider an example scenario in which a robotics framework is connected to a lidar system over a first network connection. The lidar system may be associated with an IP address and a port. The IP address and the port may have been used to generate the first network connection between the robotics framework and the lidar system. Each time the robotics framework receives data from the lidar system, the implicit logging module 306 can log the data along with the IP address and the port. Furthermore, the implicit logging module 306 can be configured to tag the data with one or more topics, and the one or more topics may also be stored as structured information associated with the data. For example, each time data is received from the lidar system, the implicit logging module 306 can tag the data with the topic "read_lidarsystem," and each time data is written to the lidar system, the implicit logging module 306 can tag the data with the topic "write_lidarsystem."

By performing the functions described above, the implicit logging module 306 can generate and maintain a complete record of all communications and/or data transmissions between a robotics framework and one or more hardware devices (e.g., one or more sensors on a vehicle). For example, as a vehicle is driving around, multiple sensors on the vehicle may be collecting data. Each sensor may have a network connection between the sensor and a robotics framework implemented on the vehicle, and may be providing data to the robotics framework and/or receiving data from the robotics framework. The data transmitted between the robotics framework and each sensor may be formatted, for example, as UDP packets or TCP packets. Since all of the data transmitted between the robotics framework and each sensor is implicitly (e.g., automatically) logged in a structured manner in a data log by the implicit logging module 306, the data log represents a complete record of all data received from the multiple sensors on the vehicle and/or transmitted to the multiple sensors on the vehicle. The structured data stored in the data log can be used, at a later time, by a robotics framework to inject simulated or virtual data into a virtual network socket in order to simulate communications with an actual hardware device, as will be described in greater detail below.

The virtual network socket module 308 can be configured to create and manage virtual network connections (e.g., virtual network sockets) which simulate real network connections to hardware devices. An example configuration in which a robotics framework is connected to a data log using a virtual network socket is demonstrated in FIG. 4B As discussed above, one drawback of conventional robotics frameworks and device drivers is that device drivers are tightly coupled to hardware devices, and often require the physical presence of a hardware device. As such, in order to test services on a robotics framework, physical hardware devices are often needed to provide input data to test the services. However, in accordance within the present technology, rather than receiving data directly from a hardware device, device drivers receive data from a robotics framework. As such, device drivers in the presently disclosed technology may not require the physical presence of a hardware device. Rather, a robotics framework can (e.g., using the virtual network socket module 308) generate a virtual network connection which simulates a "real" network connection to an actual hardware device. The virtual network connection can provide data from a data log or data file in order to simulate receiving data provided in real-time by an actual hardware device.

In certain embodiments, the virtual network socket module 308 can be configured to receive an instruction to create a network connection (i.e., a network socket) connecting the robotics framework and a component on a network. The instruction may be provided by a service implemented on the robotics framework. For example, the instruction may be provided by a device driver implemented on the robotics framework. The instruction may be identical to an instruction that may be received by the hardware network socket module 304, as discussed above. As also discussed above, the instruction may specify a particular component on a network for the robotics framework to connect to. For example, the instruction may specify an IP address and a port. The IP address and the port may be associated with a particular hardware device (e.g., a particular sensor). An example instruction may read as follows: createUDPSocket (IP address, port, [read_lidar1, write_lidar1], callback_function).

As discussed above, the hardware network socket module 304 may receive the example instruction and generate an actual network connection between the robotics framework and a hardware component. In contrast, the virtual network socket module 308 can receive the same instruction and generate a virtual network connection (i.e., a virtual network socket) which simulates an actual connection with the hardware component. Rather than receiving data directly from an actual hardware device, the virtual network socket module 308 can use a virtual network connection to receive data from any number of sources, such as data files or data logs (e.g., a data log generated by the implicit logging module 306). The virtual network socket module 308 can provide data to the robotics framework that is substantially similar to data that may be received from an actual hardware device. The robotics framework can then provide that data to the service (e.g., the device driver) that issued the function call that generated the virtual network connection. As such, from the perspective of the service, the experience is identical regardless of whether data is received from a real network connection or a virtual network connection.

In certain scenarios, an instruction (e.g. a function call) from a service, such as the example instruction discussed above, may result in an actual network connection between a robotics framework and a hardware device. However, in other scenarios, the same instruction may result in a virtual network connection which simulates an actual connection between the robotics framework and a hardware device. In an embodiment, the determination of whether to generate a real network connection or a virtual network connection may depend on a mode of operation for a robotics framework. For example, if one or more services on a robotics framework are being tested, the robotics framework may be initiated in a "test mode" or a "simulation mode." The test mode or simulation mode may indicate that actual hardware components are not physically present, and any network connections should be generated as virtual network connections using the virtual network socket module 308. However, if the robotics framework is not in a test mode or a simulation mode, this may indicate that actual hardware components are available, and any network connections should be generated as actual network connections using the hardware network socket module 304.

The virtual network socket module 308 can receive a data log, such as a data log generated by the implicit logging module 306. The data log can include a record of data transmissions between the robotics framework and one or more sensors on a vehicle. The data log may order the data transmissions sequentially based on an order in which data transmissions were transmitted. The virtual network socket module 308 can process the data transmissions sequentially. The virtual network socket module 308 can then provide data, as appropriate, to various network connections based on structured information associated with each data transmission contained in the data log. For example, consider an example scenario in which a first device driver has issued a function call instructing a robotics framework to generate a first network connection based on a first IP address and a first port. In response, the robotics framework determines that it is in a test mode (or a simulation mode), and generates a first virtual network connection associated with the first IP address and the first port. The virtual network socket module 308 analyzes a set of data transmissions in a data log. Each time the virtual network socket module 308 identifies a data transmission associated with the first IP address and the first port, the virtual network socket module 308 can transmit the data transmission to the first device driver using a callback function specified in the first device driver's original function call. If the original function call specifies one or more topics, then the virtual network socket module 308 can transmit any data transmissions which match the IP address, the port, and the topics specified in the original function call. In this way, the virtual network socket module 308 can simulate an actual connection to a hardware device using a data log and a virtual network connection. If there are multiple network connections being managed by the robotics framework, with each network connection being associated with a unique IP address/port pairing, the virtual network socket module 308 can analyze data transmissions in the data log and transmit to the appropriate network connections based on IP address and port information. In certain embodiments, one or more services implemented on the robotics framework can be tested using simulated hardware inputs from the data log.

Figure 4A:
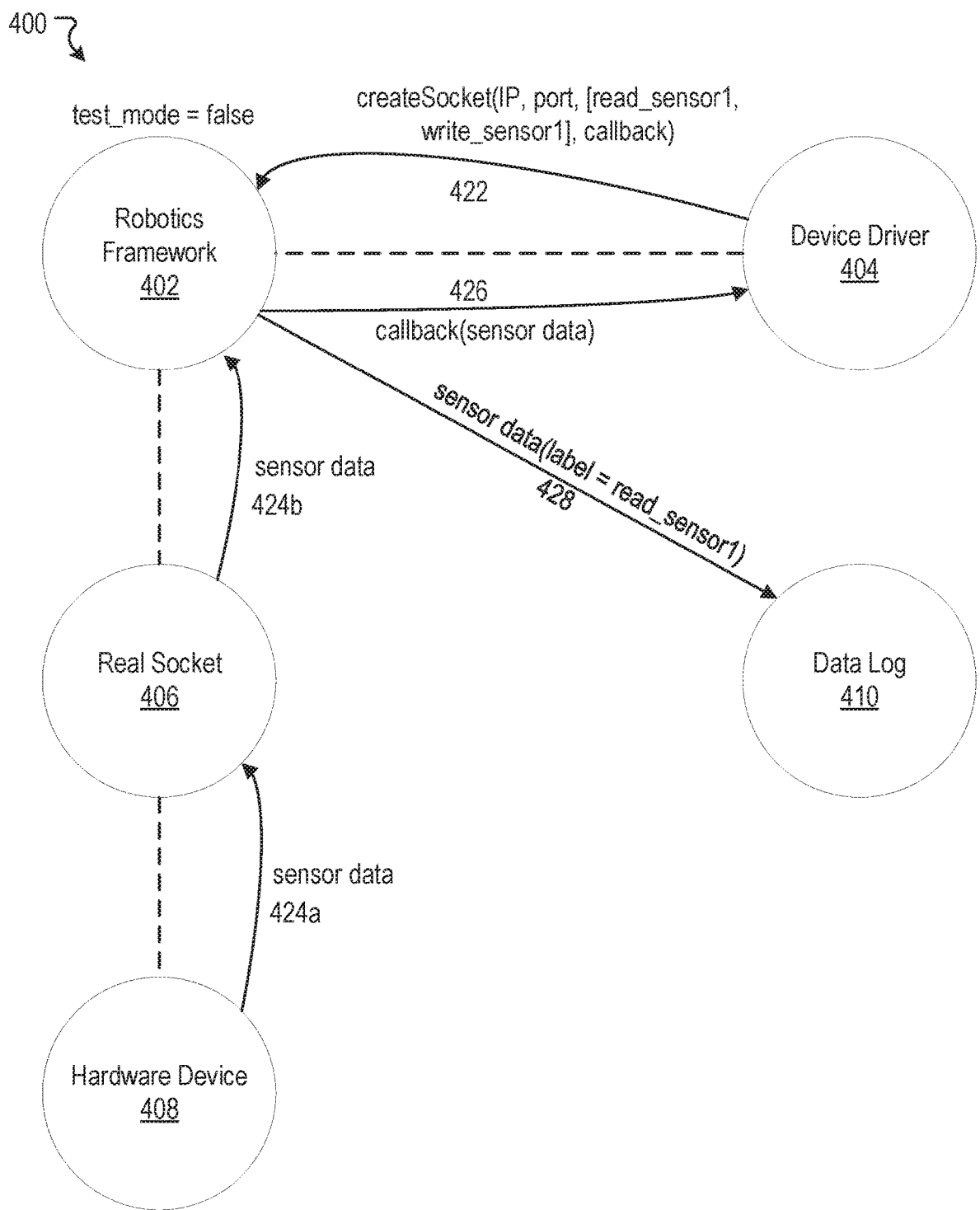
FIGS. 4A-4B illustrate example scenarios, according to various embodiments of the present technology.
Figure 4B:
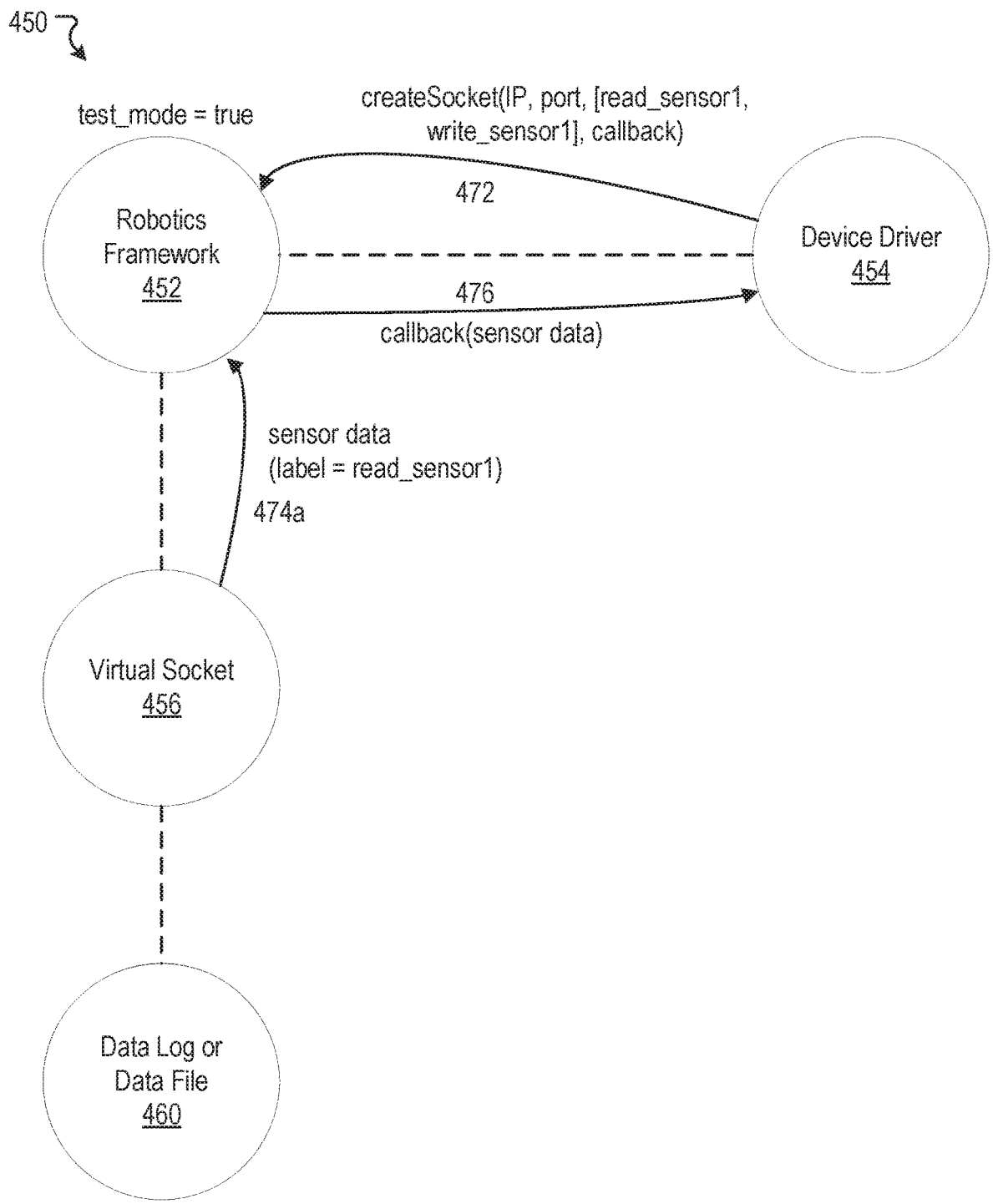

FIGS. 4A and 4B illustrate example scenarios 400 and 450 to illustrate various features of the present technology. FIG. 4A illustrates an example scenario 400 in which a robotics framework generates a real network socket to communicate with a hardware device. In the example scenario 400, a robotics framework 402 is initiated, and it is determined that the robotics framework is not in a test mode (i.e., "test_mode=false"). A device driver 404 implemented on the robotics framework 402 issues a function call instructing the robotics framework to generate a socket (arrow 422). The example function call reads as follows: createSocket(IP, port, [read_sensor1, write_sensor1], callback). A first field in the function call identifies an IP address, and a second field in the function call identifies a port. The IP address and the port are associated with and/or define a hardware device that the device driver 404 would like to communicate with. A third field in the function call identifies a set of topics. The set of topics identifies types of data that the device driver 404 would like to receive. For example, the set of topics may indicate that the device driver 404 would like to receive, from the IP address and port specified, any data that has been tagged with at least one of the topics in the set of topics. A fourth field in the function call identifies a callback function that can be used by the robotics framework 402 to inform the device driver 404 when data has been received from the requested network socket and to provide the device driver 404 with the data.

In response to the function call from the device driver 404, and the determination that the robotics framework is not in a test mode, the robotics framework 402 generates a network socket 406. The network socket 406 is a real network socket that connects the robotics framework 402 to a hardware device 408. The real network socket 406 may be generated and maintained, for example, by the hardware network socket module 304 of FIG. 3. The hardware device 408 may be, for example, a sensor on a vehicle. Sensor data is transmitted from the hardware device 408 to the robotics framework 402 via the real network socket 406 (arrows 424a-b). The robotics framework 402 utilizes the callback function specified in the function call of the device driver 404 to provide the sensor data to the device driver 404 (arrow 426). Furthermore, the robotics framework 402 automatically logs the data transmission from the hardware device 408 into a data log 410 (arrow 428). The data transmission is stored in a structured format which includes the sensor data from the hardware device, the IP address, the port, and one or more topic tags for the data (e.g., "read_sensor1").

FIG. 4B illustrates an example scenario 450 in which a robotics framework generates a virtual network socket to simulate communications with a hardware device. In the example scenario 450, a robotics framework 452 is initiated, and it is determined that the robotics framework is in a test mode (i.e., "test_mode=true"). A device driver 454 implemented on the robotics framework 452 issues a function call instructing the robotics framework 452 to generate a socket (arrow 472). The example function call in the example scenario 450 is identical to the function call in the example scenario 400 of FIG. 4A.

In response to the function call from the device driver 454, and the determination that the robotics framework 452 is in a test mode, the robotics framework 452 generates a virtual network socket 456. The virtual network socket 456 does not actually connect to a hardware device but, rather, simulates a connection to a hardware device by providing the device driver 454 with data as if the data was received from a connection to a hardware device. The virtual network socket 456 may be generated and maintained, for example, by the virtual network socket module 308 of FIG. 3. The virtual socket 456 provides the robotics framework 452 with data from a data log or data file 460. The data log may, for example, be a data log generated by the implicit logging module 306 based on actual data transmissions from hardware devices. In the example scenario 450, the virtual socket 456 and/or the robotics framework 452 identifies a first set of sensor data (e.g., a first data transmission) that satisfies the IP address, port, and topic requirements specified in function call of the device driver 454. The robotics framework 452 receives the first set of sensor data from the data log 460 via the virtual socket 456 (arrow 474a). The robotics framework 452 utilizes the callback function specified in the function call of the device driver 454 to provide the first set of sensor data to the device driver 454 (arrow 476). As such, the robotics framework 452 has simulated the experience of receiving data from a hardware device over an actual network socket without actually connecting to a hardware device. The device driver 454 receives the first set of sensor data. From the perspective of the device driver 454, the experiences in FIG. 4A (real network socket connected to a hardware device) and FIG. 4B (virtual network socket not connected to a hardware device) are essentially indistinguishable. As such, the example scenario 450 depicted in FIG. 4B is useful for testing one or more services on the robotics framework 452 without requiring hardware devices to be physically present and connected to the robotics framework 452.

FIG. 5 illustrates an example method 500, according to an embodiment of the present technology. At block 502, the example method 500 can initiate a robotics framework configured to enable inter-process communications between a plurality of services implemented on the robotics framework, the plurality of services configured to at least some features of a vehicle. At block 504, the example method 500 can receive a function call from a first service of the plurality of services instructing the robotics framework to generate a network socket. At block 506, the example method 500 can generate a network socket configured to receive data from a data source based on the function call.

Many variations to the example method are possible. It should be appreciated that there can be additional, fewer, or alternative steps performed in similar or alternative orders, or in parallel, within the scope of the various embodiments discussed herein unless otherwise stated.

Figure 6:
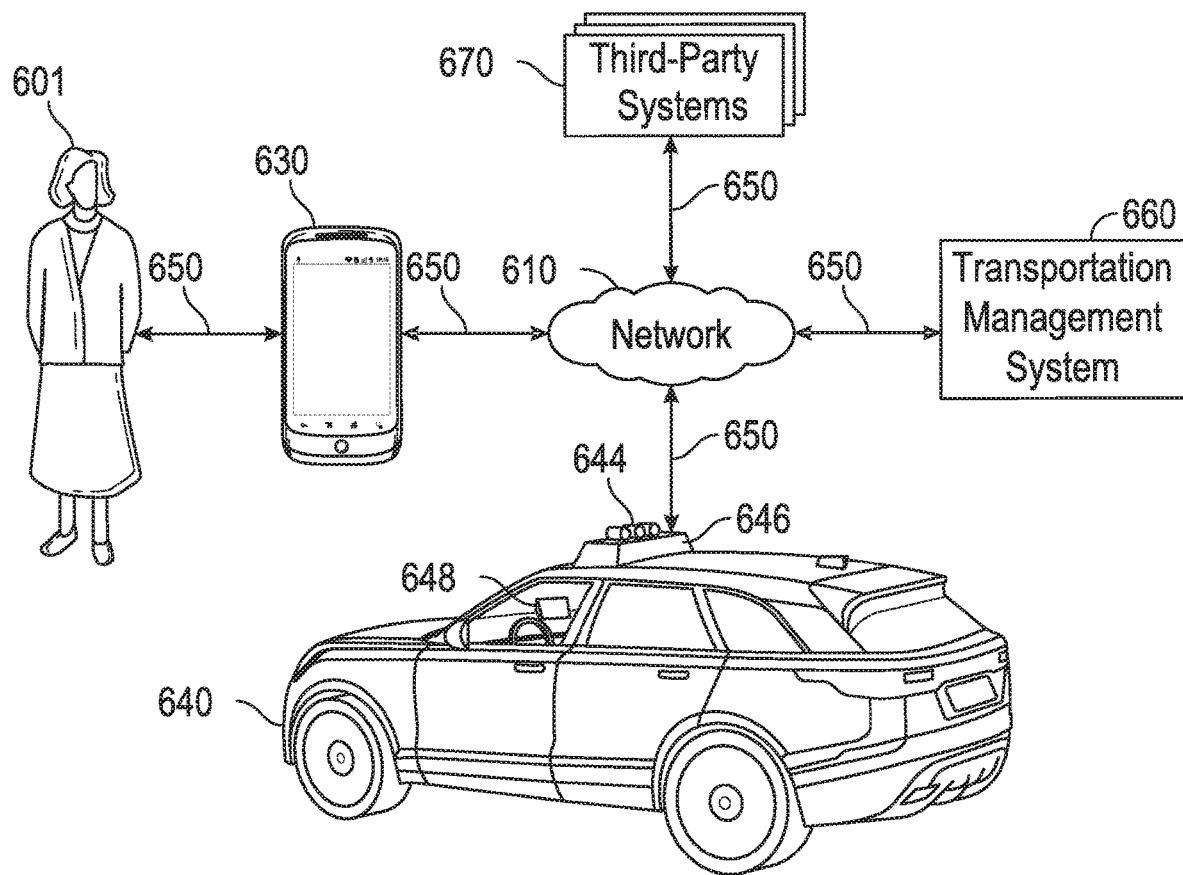
FIG. 6 illustrates an example block diagram of a transportation management environment, according to an embodiment of the present technology.

FIG. 6 illustrates an example block diagram of a transportation management environment for matching ride requestors with vehicles. In particular embodiments, the environment may include various computing entities, such as a user computing device 630 of a user 601 (e.g., a ride provider or requestor), a transportation management system 660, a vehicle 640, and one or more third-party systems 670. The vehicle 640 can be autonomous, semi-autonomous, or manually drivable. The computing entities may be communicatively connected over any suitable network 610. As an example and not by way of limitation, one or more portions of network 610 may include an ad hoc network, an extranet, a virtual private network (VPN), a local area network (LAN), a wireless LAN (WLAN), a wide area network (WAN), a wireless WAN (WWAN), a metropolitan area network (MAN), a portion of the Internet, a portion of Public Switched Telephone Network (PSTN), a cellular network, or a combination of any of the above. In particular embodiments, any suitable network arrangement and protocol enabling the computing entities to communicate with each other may be used. Although FIG. 6 illustrates a single user device 630, a single transportation management system 660, a single vehicle 640, a plurality of third-party systems 670, and a single network 610, this disclosure contemplates any suitable number of each of these entities. As an example and not by way of limitation, the network environment may include multiple users 601, user devices 630, transportation management systems 660, vehicles 640, third-party systems 670, and networks 610. In some embodiments, some or all modules of the robotics framework module 302 may be implemented by one or more computing systems of the transportation management system 660. In some embodiments, some or all modules of the robotics framework module 302 may be implemented by one or more computing systems in the vehicle 640.

The user device 630, transportation management system 660, vehicle 640, and third-party system 670 may be communicatively connected or co-located with each other in whole or in part. These computing entities may communicate via different transmission technologies and network types. For example, the user device 630 and the vehicle 640 may communicate with each other via a cable or short-range wireless communication (e.g., Bluetooth, NFC, WI-FI, etc.), and together they may be connected to the Internet via a cellular network that is accessible to either one of the devices (e.g., the user device 630 may be a smartphone with LTE connection). The transportation management system 660 and third-party system 670, on the other hand, may be connected to the Internet via their respective LAN/WLAN networks and Internet Service Providers (ISP). FIG. 6 illustrates transmission links 650 that connect user device 630, vehicle 640, transportation management system 660, and third-party system 670 to communication network 610. This disclosure contemplates any suitable transmission links 650, including, e.g., wire connections (e.g., USB, Lightning, Digital Subscriber Line (DSL) or Data Over Cable Service Interface Specification (DOCSIS)), wireless connections (e.g., WI-FI, WiMAX, cellular, satellite, NFC, Bluetooth), optical connections (e.g., Synchronous Optical Networking (SONET), Synchronous Digital Hierarchy (SDH)), any other wireless communication technologies, and any combination thereof. In particular embodiments, one or more links 650 may connect to one or more networks 610, which may include in part, e.g., ad-hoc network, the Intranet, extranet, VPN, LAN, WLAN, WAN, WWAN, MAN, PSTN, a cellular network, a satellite network, or any combination thereof. The computing entities need not necessarily use the same type of transmission link 650. For example, the user device 630 may communicate with the transportation management system via a cellular network and the Internet, but communicate with the vehicle 640 via Bluetooth or a physical wire connection.

In particular embodiments, the transportation management system 660 may fulfill ride requests for one or more users 601 by dispatching suitable vehicles. The transportation management system 660 may receive any number of ride requests from any number of ride requestors 601. In particular embodiments, a ride request from a ride requestor 601 may include an identifier that identifies the ride requestor in the system 660. The transportation management system 660 may use the identifier to access and store the ride requestor's 601 information, in accordance with the requestor's 601 privacy settings. The ride requestor's 601 information may be stored in one or more data stores (e.g., a relational database system) associated with and accessible to the transportation management system 660. In particular embodiments, ride requestor information may include profile information about a particular ride requestor 601. In particular embodiments, the ride requestor 601 may be associated with one or more categories or types, through which the ride requestor 601 may be associated with aggregate information about certain ride requestors of those categories or types. Ride information may include, for example, preferred pick-up and drop-off locations, driving preferences (e.g., safety comfort level, preferred speed, rates of acceleration/deceleration, safety distance from other vehicles when travelling at various speeds, route, etc.), entertainment preferences and settings (e.g., preferred music genre or playlist, audio volume, display brightness, etc.), temperature settings, whether conversation with the driver is welcomed, frequent destinations, historical riding patterns (e.g., time of day of travel, starting and ending locations, etc.), preferred language, age, gender, or any other suitable information. In particular embodiments, the transportation management system 660 may classify a user 601 based on known information about the user 601 (e.g., using machine-learning classifiers), and use the classification to retrieve relevant aggregate information associated with that class. For example, the system 660 may classify a user 601 as a young adult and retrieve relevant aggregate information associated with young adults, such as the type of music generally preferred by young adults.

Transportation management system 660 may also store and access ride information. Ride information may include locations related to the ride, traffic data, route options, optimal pick-up or drop-off locations for the ride, or any other suitable information associated with a ride. As an example and not by way of limitation, when the transportation management system 660 receives a request to travel from San Francisco International Airport (SFO) to Palo Alto, Calif., the system 660 may access or generate any relevant ride information for this particular ride request. The ride information may include, for example, preferred pick-up locations at SFO; alternate pick-up locations in the event that a pick-up location is incompatible with the ride requestor (e.g., the ride requestor may be disabled and cannot access the pick-up location) or the pick-up location is otherwise unavailable due to construction, traffic congestion, changes in pick-up/drop-off rules, or any other reason; one or more routes to navigate from SFO to Palo Alto; preferred off-ramps for a type of user; or any other suitable information associated with the ride. In particular embodiments, portions of the ride information may be based on historical data associated with historical rides facilitated by the system 660. For example, historical data may include aggregate information generated based on past ride information, which may include any ride information described herein and telemetry data collected by sensors in vehicles and user devices. Historical data may be associated with a particular user (e.g., that particular user's preferences, common routes, etc.), a category/class of users (e.g., based on demographics), and all users of the system 660. For example, historical data specific to a single user may include information about past rides that particular user has taken, including the locations at which the user is picked up and dropped off, music the user likes to listen to, traffic information associated with the rides, time of the day the user most often rides, and any other suitable information specific to the user. As another example, historical data associated with a category/class of users may include, e.g., common or popular ride preferences of users in that category/class, such as teenagers preferring pop music, ride requestors who frequently commute to the financial district may prefer to listen to the news, etc. As yet another example, historical data associated with all users may include general usage trends, such as traffic and ride patterns. Using historical data, the system 660 in particular embodiments may predict and provide ride suggestions in response to a ride request. In particular embodiments, the system 660 may use machine-learning, such as neural networks, regression algorithms, instance-based algorithms (e.g., k-Nearest Neighbor), decision-tree algorithms, Bayesian algorithms, clustering algorithms, association-rule-learning algorithms, deep-learning algorithms, dimensionality-reduction algorithms, ensemble algorithms, and any other suitable machine-learning algorithms known to persons of ordinary skill in the art. The machine-learning models may be trained using any suitable training algorithm, including supervised learning based on labeled training data, unsupervised learning based on unlabeled training data, and semi-supervised learning based on a mixture of labeled and unlabeled training data.

In particular embodiments, transportation management system 660 may include one or more server computers. Each server may be a unitary server or a distributed server spanning multiple computers or multiple datacenters. The servers may be of various types, such as, for example and without limitation, web server, news server, mail server, message server, advertising server, file server, application server, exchange server, database server, proxy server, another server suitable for performing functions or processes described herein, or any combination thereof. In particular embodiments, each server may include hardware, software, or embedded logic components or a combination of two or more such components for carrying out the appropriate functionalities implemented or supported by the server. In particular embodiments, transportation management system 660 may include one or more data stores. The data stores may be used to store various types of information, such as ride information, ride requestor information, ride provider information, historical information, third-party information, or any other suitable type of information. In particular embodiments, the information stored in the data stores may be organized according to specific data structures. In particular embodiments, each data store may be a relational, columnar, correlation, or any other suitable type of database system. Although this disclosure describes or illustrates particular types of databases, this disclosure contemplates any suitable types of databases. Particular embodiments may provide interfaces that enable a user device 630 (which may belong to a ride requestor or provider), a transportation management system 660, vehicle system 640, or a third-party system 670 to process, transform, manage, retrieve, modify, add, or delete the information stored in the data store.

In particular embodiments, transportation management system 660 may include an authorization server (or any other suitable component(s)) that allows users 601 to opt-in to or opt-out of having their information and actions logged, recorded, or sensed by transportation management system 660 or shared with other systems (e.g., third-party systems 670). In particular embodiments, a user 601 may opt-in or opt-out by setting appropriate privacy settings. A privacy setting of a user may determine what information associated with the user may be logged, how information associated with the user may be logged, when information associated with the user may be logged, who may log information associated with the user, whom information associated with the user may be shared with, and for what purposes information associated with the user may be logged or shared.

Authorization servers may be used to enforce one or more privacy settings of the users 601 of transportation management system 660 through blocking, data hashing, anonymization, or other suitable techniques as appropriate.

In particular embodiments, third-party system 670 may be a network-addressable computing system that may provide HD maps or host GPS maps, customer reviews, music or content, weather information, or any other suitable type of information. Third-party system 670 may generate, store, receive, and send relevant data, such as, for example, map data, customer review data from a customer review website, weather data, or any other suitable type of data. Third-party system 670 may be accessed by the other computing entities of the network environment either directly or via network 610. For example, user device 630 may access the third-party system 670 via network 610, or via transportation management system 660. In the latter case, if credentials are required to access the third-party system 670, the user 601 may provide such information to the transportation management system 660, which may serve as a proxy for accessing content from the third-party system 670.

In particular embodiments, user device 630 may be a mobile computing device such as a smartphone, tablet computer, or laptop computer. User device 630 may include one or more processors (e.g., CPU, GPU), memory, and storage. An operating system and applications may be installed on the user device 630, such as, e.g., a transportation application associated with the transportation management system 660, applications associated with third-party systems 670, and applications associated with the operating system. User device 630 may include functionality for determining its location, direction, or orientation, based on integrated sensors such as GPS, compass, gyroscope, or accelerometer. User device 630 may also include wireless transceivers for wireless communication and may support wireless communication protocols such as Bluetooth, near-field communication (NFC), infrared (IR) communication, WI-FI, and 2G/3G/4G/LTE mobile communication standard. User device 630 may also include one or more cameras, scanners, touchscreens, microphones, speakers, and any other suitable input-output devices.

In particular embodiments, the vehicle 640 may be equipped with an array of sensors 644, a navigation system 646, and a ride-service computing device 648. In particular embodiments, a fleet of vehicles 640 may be managed by the transportation management system 660. The fleet of vehicles 640, in whole or in part, may be owned by the entity associated with the transportation management system 660, or they may be owned by a third-party entity relative to the transportation management system 660. In either case, the transportation management system 660 may control the operations of the vehicles 640, including, e.g., dispatching select vehicles 640 to fulfill ride requests, instructing the vehicles 640 to perform select operations (e.g., head to a service center or charging/fueling station, pull over, stop immediately, self-diagnose, lock/unlock compartments, change music station, change temperature, and any other suitable operations), and instructing the vehicles 640 to enter select operation modes (e.g., operate normally, drive at a reduced speed, drive under the command of human operators, and any other suitable operational modes).

In particular embodiments, the vehicles 640 may receive data from and transmit data to the transportation management system 660 and the third-party system 670. Examples of received data may include, e.g., instructions, new software or software updates, maps, 3D models, trained or untrained machine-learning models, location information (e.g., location of the ride requestor, the vehicle 640 itself, other vehicles 640, and target destinations such as service centers), navigation information, traffic information, weather information, entertainment content (e.g., music, video, and news) ride requestor information, ride information, and any other suitable information. Examples of data transmitted from the vehicle 640 may include, e.g., telemetry and sensor data, determinations/decisions based on such data, vehicle condition or state (e.g., battery/fuel level, tire and brake conditions, sensor condition, speed, odometer, etc.), location, navigation data, passenger inputs (e.g., through a user interface in the vehicle 640, passengers may send/receive data to the transportation management system 660 and third-party system 670), and any other suitable data.

In particular embodiments, vehicles 640 may also communicate with each other, including those managed and not managed by the transportation management system 660. For example, one vehicle 640 may communicate with another vehicle data regarding their respective location, condition, status, sensor reading, and any other suitable information. In particular embodiments, vehicle-to-vehicle communication may take place over direct short-range wireless connection (e.g., WI-FI, Bluetooth, NFC) or over a network (e.g., the Internet or via the transportation management system 660 or third-party system 670), or both.

In particular embodiments, a vehicle 640 may obtain and process sensor/telemetry data. Such data may be captured by any suitable sensors. For example, the vehicle 640 may have a Light Detection and Ranging (LiDAR) sensor array of multiple LiDAR transceivers that are configured to rotate 360°, emitting pulsed laser light and measuring the reflected light from objects surrounding vehicle 640. In particular embodiments, LiDAR transmitting signals may be steered by use of a gated light valve, which may be a MEMs device that directs a light beam using the principle of light diffraction. Such a device may not use a gimbaled mirror to steer light beams in 360° around the vehicle. Rather, the gated light valve may direct the light beam into one of several optical fibers, which may be arranged such that the light beam may be directed to many discrete positions around the vehicle. Thus, data may be captured in 360° around the vehicle, but no rotating parts may be necessary. A LiDAR is an effective sensor for measuring distances to targets, and as such may be used to generate a three-dimensional (3D) model of the external environment of the vehicle 640. As an example and not by way of limitation, the 3D model may represent the external environment including objects such as other cars, curbs, debris, objects, and pedestrians up to a maximum range of the sensor arrangement (e.g., 50, 100, or 200 meters). As another example, the vehicle 640 may have optical cameras pointing in different directions. The cameras may be used for, e.g., recognizing roads, lane markings, street signs, traffic lights, police, other vehicles, and any other visible objects of interest. To enable the vehicle 640 to "see" at night, infrared cameras may be installed. In particular embodiments, the vehicle may be equipped with stereo vision for, e.g., spotting hazards such as pedestrians or tree branches on the road. As another example, the vehicle 640 may have radars for, e.g., detecting other vehicles and hazards afar. Furthermore, the vehicle 640 may have ultrasound equipment for, e.g., parking and obstacle detection. In addition to sensors enabling the vehicle 640 to detect, measure, and understand the external world around it, the vehicle 640 may further be equipped with sensors for detecting and self-diagnosing the vehicle's own state and condition. For example, the vehicle 640 may have wheel sensors for, e.g., measuring velocity; global positioning system (GPS) for, e.g., determining the vehicle's current geolocation; and inertial measurement units, accelerometers, gyroscopes, and odometer systems for movement or motion detection. While the description of these sensors provides particular examples of utility, one of ordinary skill in the art would appreciate that the utilities of the sensors are not limited to those examples. Further, while an example of a utility may be described with respect to a particular type of sensor, it should be appreciated that the utility may be achieved using any combination of sensors. For example, the vehicle 640 may build a 3D model of its surrounding based on data from its LiDAR, radar, sonar, and cameras, along with a pre-generated map obtained from the transportation management system 660 or the third-party system 670. Although sensors 644 appear in a particular location on the vehicle 640 in FIG. 6, sensors 644 may be located in any suitable location in or on the vehicle 640. Example locations for sensors include the front and rear bumpers, the doors, the front windshield, on the side panel, or any other suitable location.

In particular embodiments, the vehicle 640 may be equipped with a processing unit (e.g., one or more CPUs and GPUs), memory, and storage. The vehicle 640 may thus be equipped to perform a variety of computational and processing tasks, including processing the sensor data, extracting useful information, and operating accordingly. For example, based on images captured by its cameras and a machine-vision model, the vehicle 640 may identify particular types of objects captured by the images, such as pedestrians, other vehicles, lanes, curbs, and any other objects of interest.

In particular embodiments, the vehicle 640 may have a navigation system 646 responsible for safely navigating the vehicle 640. In particular embodiments, the navigation system 646 may take as input any type of sensor data from, e.g., a Global Positioning System (GPS) module, inertial measurement unit (IMU), LiDAR sensors, optical cameras, radio frequency (RF) transceivers, or any other suitable telemetry or sensory mechanisms. The navigation system 646 may also utilize, e.g., map data, traffic data, accident reports, weather reports, instructions, target destinations, and any other suitable information to determine navigation routes and particular driving operations (e.g., slowing down, speeding up, stopping, swerving, etc.). In particular embodiments, the navigation system 646 may use its determinations to control the vehicle 640 to operate in prescribed manners and to guide the vehicle 640 to its destinations without colliding into other objects. Although the physical embodiment of the navigation system 646 (e.g., the processing unit) appears in a particular location on the vehicle 640 in FIG. 6, navigation system 646 may be located in any suitable location in or on the vehicle 640. Example locations for navigation system 646 include inside the cabin or passenger compartment of the vehicle 640, near the engine/battery, near the front seats, rear seats, or in any other suitable location.

In particular embodiments, the vehicle 640 may be equipped with a ride-service computing device 648, which may be a tablet or any other suitable device installed by transportation management system 660 to allow the user to interact with the vehicle 640, transportation management system 660, other users 601, or third-party systems 670. In particular embodiments, installation of ride-service computing device 648 may be accomplished by placing the ride-service computing device 648 inside the vehicle 640, and configuring it to communicate with the vehicle 640 via a wired or wireless connection (e.g., via Bluetooth). Although FIG. 6 illustrates a single ride-service computing device 648 at a particular location in the vehicle 640, the vehicle 640 may include several ride-service computing devices 648 in several different locations within the vehicle. As an example and not by way of limitation, the vehicle 640 may include four ride-service computing devices 648 located in the following places: one in front of the front-left passenger seat (e.g., driver's seat in traditional U.S. automobiles), one in front of the front-right passenger seat, one in front of each of the rear-left and rear-right passenger seats. In particular embodiments, ride-service computing device 648 may be detachable from any component of the vehicle 640. This may allow users to handle ride-service computing device 648 in a manner consistent with other tablet computing devices. As an example and not by way of limitation, a user may move ride-service computing device 648 to any location in the cabin or passenger compartment of the vehicle 640, may hold ride-service computing device 648, or handle ride-service computing device 648 in any other suitable manner. Although this disclosure describes providing a particular computing device in a particular manner, this disclosure contemplates providing any suitable computing device in any suitable manner.

Figure 7:
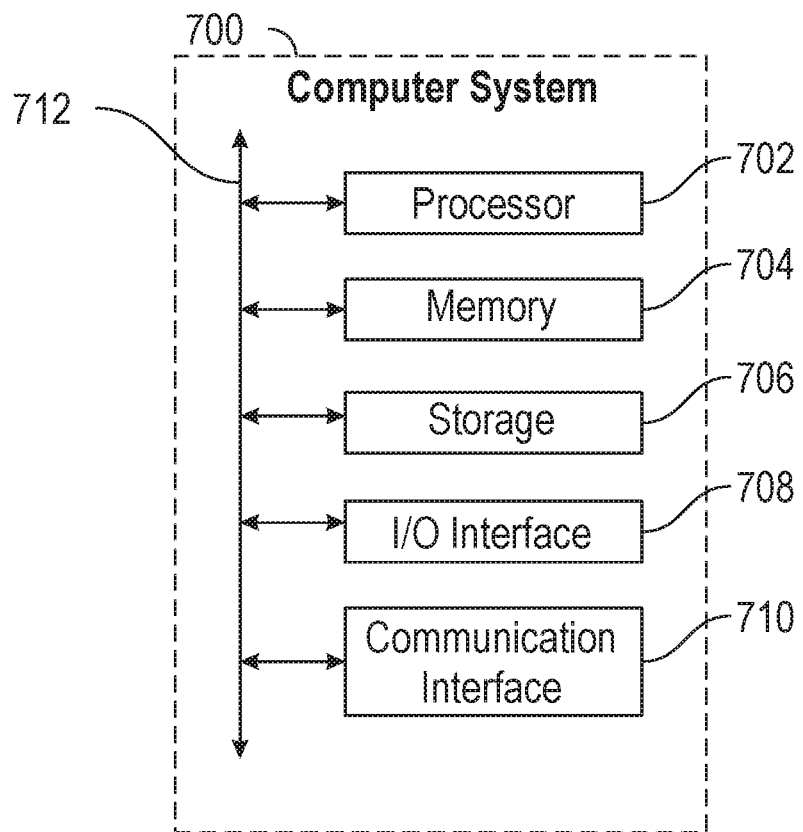
FIG. 7 illustrates an example of a computer system or computing device that can be utilized in various scenarios, according to an embodiment of the present technology.

FIG. 7 illustrates an example computer system 700. In particular embodiments, one or more computer systems 700 perform one or more steps of one or more methods described or illustrated herein. In particular embodiments, one or more computer systems 700 provide the functionalities described or illustrated herein. In particular embodiments, software running on one or more computer systems 700 performs one or more steps of one or more methods described or illustrated herein or provides the functionalities described or illustrated herein. Particular embodiments include one or more portions of one or more computer systems 700. Herein, a reference to a computer system may encompass a computing device, and vice versa, where appropriate. Moreover, a reference to a computer system may encompass one or more computer systems, where appropriate.

This disclosure contemplates any suitable number of computer systems 700. This disclosure contemplates computer system 700 taking any suitable physical form. As example and not by way of limitation, computer system 700 may be an embedded computer system, a system-on-chip (SOC), a single-board computer system (SBC) (such as, for example, a computer-on-module (COM) or system-on-module (SOM)), a desktop computer system, a laptop or notebook computer system, an interactive kiosk, a mainframe, a mesh of computer systems, a mobile telephone, a personal digital assistant (PDA), a server, a tablet computer system, an augmented/virtual reality device, or a combination of two or more of these. Where appropriate, computer system 700 may include one or more computer systems 700; be unitary or distributed; span multiple locations; span multiple machines; span multiple data centers; or reside in a cloud, which may include one or more cloud components in one or more networks. Where appropriate, one or more computer systems 700 may perform without substantial spatial or temporal limitation one or more steps of one or more methods described or illustrated herein. As an example and not by way of limitation, one or more computer systems 700 may perform in real time or in batch mode one or more steps of one or more methods described or illustrated herein. One or more computer systems 700 may perform at different times or at different locations one or more steps of one or more methods described or illustrated herein, where appropriate.

In particular embodiments, computer system 700 includes a processor 702, memory 704, storage 706, an input/output (I/O) interface 708, a communication interface 710, and a bus 712. Although this disclosure describes and illustrates a particular computer system having a particular number of particular components in a particular arrangement, this disclosure contemplates any suitable computer system having any suitable number of any suitable components in any suitable arrangement.

In particular embodiments, processor 702 includes hardware for executing instructions, such as those making up a computer program. As an example and not by way of limitation, to execute instructions, processor 702 may retrieve (or fetch) the instructions from an internal register, an internal cache, memory 704, or storage 706; decode and execute them; and then write one or more results to an internal register, an internal cache, memory 704, or storage 706. In particular embodiments, processor 702 may include one or more internal caches for data, instructions, or addresses. This disclosure contemplates processor 702 including any suitable number of any suitable internal caches, where appropriate. As an example and not by way of limitation, processor 702 may include one or more instruction caches, one or more data caches, and one or more translation lookaside buffers (TLBs). Instructions in the instruction caches may be copies of instructions in memory 704 or storage 706, and the instruction caches may speed up retrieval of those instructions by processor 702. Data in the data caches may be copies of data in memory 704 or storage 706 that are to be operated on by computer instructions; the results of previous instructions executed by processor 702 that are accessible to subsequent instructions or for writing to memory 704 or storage 706; or any other suitable data. The data caches may speed up read or write operations by processor 702. The TLBs may speed up virtual-address translation for processor 702. In particular embodiments, processor 702 may include one or more internal registers for data, instructions, or addresses. This disclosure contemplates processor 702 including any suitable number of any suitable internal registers, where appropriate. Where appropriate, processor 702 may include one or more arithmetic logic units (ALUs), be a multi-core processor, or include one or more processors 702. Although this disclosure describes and illustrates a particular processor, this disclosure contemplates any suitable processor.

In particular embodiments, memory 704 includes main memory for storing instructions for processor 702 to execute or data for processor 702 to operate on. As an example and not by way of limitation, computer system 700 may load instructions from storage 706 or another source (such as another computer system 700) to memory 704. Processor 702 may then load the instructions from memory 704 to an internal register or internal cache. To execute the instructions, processor 702 may retrieve the instructions from the internal register or internal cache and decode them. During or after execution of the instructions, processor 702 may write one or more results (which may be intermediate or final results) to the internal register or internal cache. Processor 702 may then write one or more of those results to memory 704. In particular embodiments, processor 702 executes only instructions in one or more internal registers or internal caches or in memory 704 (as opposed to storage 706 or elsewhere) and operates only on data in one or more internal registers or internal caches or in memory 704 (as opposed to storage 706 or elsewhere). One or more memory buses (which may each include an address bus and a data bus) may couple processor 702 to memory 704. Bus 712 may include one or more memory buses, as described in further detail below. In particular embodiments, one or more memory management units (MMUs) reside between processor 702 and memory 704 and facilitate accesses to memory 704 requested by processor 702. In particular embodiments, memory 704 includes random access memory (RAM). This RAM may be volatile memory, where appropriate. Where appropriate, this RAM may be dynamic RAM (DRAM) or static RAM (SRAM). Moreover, where appropriate, this RAM may be single-ported or multi-ported RAM. This disclosure contemplates any suitable RAM. Memory 704 may include one or more memories 704, where appropriate. Although this disclosure describes and illustrates particular memory, this disclosure contemplates any suitable memory.

In particular embodiments, storage 706 includes mass storage for data or instructions. As an example and not by way of limitation, storage 706 may include a hard disk drive (HDD), a floppy disk drive, flash memory, an optical disc, a magneto-optical disc, magnetic tape, or a Universal Serial Bus (USB) drive or a combination of two or more of these. Storage 706 may include removable or non-removable (or fixed) media, where appropriate. Storage 706 may be internal or external to computer system 700, where appropriate. In particular embodiments, storage 706 is non-volatile, solid-state memory. In particular embodiments, storage 706 includes read-only memory (ROM). Where appropriate, this ROM may be mask-programmed ROM, programmable ROM (PROM), erasable PROM (EPROM), electrically erasable PROM (EEPROM), electrically alterable ROM (EAROM), or flash memory or a combination of two or more of these. This disclosure contemplates mass storage 706 taking any suitable physical form. Storage 706 may include one or more storage control units facilitating communication between processor 702 and storage 706, where appropriate. Where appropriate, storage 706 may include one or more storages 706. Although this disclosure describes and illustrates particular storage, this disclosure contemplates any suitable storage.

In particular embodiments, I/O interface 708 includes hardware or software, or both, providing one or more interfaces for communication between computer system 700 and one or more I/O devices. Computer system 700 may include one or more of these I/O devices, where appropriate. One or more of these I/O devices may enable communication between a person and computer system 700. As an example and not by way of limitation, an I/O device may include a keyboard, keypad, microphone, monitor, mouse, printer, scanner, speaker, still camera, stylus, tablet, touch screen, trackball, video camera, another suitable I/O device or a combination of two or more of these. An I/O device may include one or more sensors. This disclosure contemplates any suitable I/O devices and any suitable I/O interfaces 708 for them. Where appropriate, I/O interface 708 may include one or more device or software drivers enabling processor 702 to drive one or more of these I/O devices. I/O interface 708 may include one or more I/O interfaces 708, where appropriate. Although this disclosure describes and illustrates a particular I/O interface, this disclosure contemplates any suitable I/O interface.

In particular embodiments, communication interface 710 includes hardware or software, or both providing one or more interfaces for communication (such as, for example, packet-based communication) between computer system 700 and one or more other computer systems 700 or one or more networks. As an example and not by way of limitation, communication interface 710 may include a network interface controller (NIC) or network adapter for communicating with an Ethernet or any other wire-based network or a wireless NIC (WNIC) or wireless adapter for communicating with a wireless network, such as a WI-FI network. This disclosure contemplates any suitable network and any suitable communication interface 710 for it. As an example and not by way of limitation, computer system 700 may communicate with an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, computer system 700 may communicate with a wireless PAN (WPAN) (such as, for example, a Bluetooth WPAN), a WI-FI network, a WI-MAX network, a cellular telephone network (such as, for example, a Global System for Mobile Communications (GSM) network), or any other suitable wireless network or a combination of two or more of these. Computer system 700 may include any suitable communication interface 710 for any of these networks, where appropriate. Communication interface 710 may include one or more communication interfaces 710, where appropriate. Although this disclosure describes and illustrates a particular communication interface, this disclosure contemplates any suitable communication interface.

In particular embodiments, bus 712 includes hardware or software, or both coupling components of computer system 700 to each other. As an example and not by way of limitation, bus 712 may include an Accelerated Graphics Port (AGP) or any other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCIe) bus, a serial advanced technology attachment (SATA) bus, a Video Electronics Standards Association local (VLB) bus, or another suitable bus or a combination of two or more of these. Bus 712 may include one or more buses 712, where appropriate. Although this disclosure describes and illustrates a particular bus, this disclosure contemplates any suitable bus or interconnect.

Herein, a computer-readable non-transitory storage medium or media may include one or more semiconductor-based or other types of integrated circuits (ICs) (such, as for example, field-programmable gate arrays (FPGAs) or application-specific ICs (ASICs)), hard disk drives (HDDs), hybrid hard drives (HHDs), optical discs, optical disc drives (ODDs), magneto-optical discs, magneto-optical drives, floppy diskettes, floppy disk drives (FDDs), magnetic tapes, solid-state drives (SSDs), RAM-drives, SECURE DIGITAL cards or drives, any other suitable computer-readable non-transitory storage media, or any suitable combination of two or more of these, where appropriate. A computer-readable non-transitory storage medium may be volatile, non-volatile, or a combination of volatile and non-volatile, where appropriate.

Herein, "or" is inclusive and not exclusive, unless expressly indicated otherwise or indicated otherwise by context. Therefore, herein, "A or B" means "A or B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context.

Methods described herein may vary in accordance with the present disclosure. Various embodiments of this disclosure may repeat one or more steps of the methods described herein, where appropriate. Although this disclosure describes and illustrates particular steps of certain methods as occurring in a particular order, this disclosure contemplates any suitable steps of the methods occurring in any suitable order or in any combination which may include all, some, or none of the steps of the methods. Furthermore, although this disclosure may describe and illustrate particular components, devices, or systems carrying out particular steps of a method, this disclosure contemplates any suitable combination of any suitable components, devices, or systems carrying out any suitable steps of the method.

The scope of this disclosure encompasses all changes, substitutions, variations, alterations, and modifications to the example embodiments described or illustrated herein that a person having ordinary skill in the art would comprehend. The scope of this disclosure is not limited to the example embodiments described or illustrated herein. Moreover, although this disclosure describes and illustrates respective embodiments herein as including particular components, modules, elements, feature, functions, operations, or steps, any of these embodiments may include any combination or permutation of any of the components, modules, elements, features, functions, operations, or steps described or illustrated anywhere herein that a person having ordinary skill in the art would comprehend. Furthermore, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative. Additionally, although this disclosure describes or illustrates particular embodiments as providing particular advantages, particular embodiments may provide none, some, or all of these advantages.

What is claimed is:

1. A computer-implemented method comprising:
    initiating, by a computing system, a robotics framework configured to enable inter-process communications between a plurality of services implemented on the robotics framework, the plurality of services configured to operate at least some features of a vehicle;
    receiving, by the computing system, a function call from at least one device driver implemented as a first service of the plurality of services for instructing the robotics framework to generate a network socket;
    generating, by the computing system, a virtual network socket that is based on the function call and configured to receive data associated with the plurality of services from a data log, wherein the function call specifies at least one type of the data to be received by the device driver and a callback function; and
    transmitting, by the computing system, the at least one type of the data via the virtual network socket to the at least one device driver by using the callback function specified in the function call, wherein the virtual network socket simulates transmission of the at least one type of the data with a hardware device over a real network socket.

2. The computer-implemented method of claim 1, wherein the function call comprises a first IP address and a first port.

3. The computer-implemented method of claim 2, wherein the data log comprises a plurality of data transmissions from one or more sensors on a vehicle.

4. The computer-implemented method of claim 3, wherein each data transmission in the plurality of data transmissions is associated with an IP address and a port.

5. The computer-implemented method of claim 2, further comprising:
   identifying a first data transmission in the data log associated with the first IP address and the first port, and
   providing, via the robotics framework, the first data transmission to the at least one device driver implemented as the first service based on the first data transmission being associated with the first IP address and the first port.

6. The computer-implemented method of claim 5, wherein
   the virtual network socket is generated based on the first IP address and the first port.

7. The computer-implemented method of claim 1, wherein the virtual network socket is generated instead of the real network socket based on a determination that the robotics framework is in a test mode.

8. The computer-implemented method of claim 1, further comprising:
   receiving a second function call from a second service of the plurality of services instructing the robotics framework to generate a second network socket; and
   generating, based on the second function call, a real network socket connecting the robotics framework to a hardware device, wherein the real network socket is generated instead of a virtual network socket based on a determination that the robotics framework is not in a test mode.

9. The computer-implemented method of claim 8, further comprising:
   receiving, using the real network socket, a first set of data from the hardware device, and
   utilizing a callback function identified in the second function call to provide, via the robotics framework, the first set of data to the second service.

10. The computer-implemented method of claim 8, wherein the first set of data is associated with the at least one type of the data and stored in the data log.

11. A system comprising:
   at least one processor; and
   a memory storing instructions that, when executed by the at least one processor, cause the system to perform:
   initiating a robotics framework configured to enable inter-process communications between a plurality of services implemented on the robotics framework, the plurality of services configured to operate at least some features of a vehicle;
   receiving a function call from at least one device driver implemented as a first service of the plurality of services for instructing the robotics framework to generate a network socket;
   generating a virtual network socket that is based on the function call and configured to receive data associated with the plurality of services from a data log, wherein the function call specifies at least one type of the data to be received by the device driver and a callback function; and
   transmitting the at least one type of the data via the virtual network socket to the at least one device driver by using the callback function specified in the function call, wherein the virtual network socket simulates transmission of the at least one type of the data with a hardware device over a real network socket.

12. The system of claim 11, wherein the function call comprises a first IP address and a first port.

13. The system of claim 12, wherein the data log comprises a plurality of data transmissions from one or more sensors on a vehicle.

14. The system of claim 13, wherein each data transmission in the plurality of data transmissions is associated with an IP address and a port.

15. The system of claim 14, wherein the instructions, when executed by the at least one processor, further cause the system to perform:
   identifying a first data transmission in the data log associated with the first IP address and the first port, and
   providing, via the robotics framework, the first data transmission to the at least one device driver implemented as the first service based on the first data transmission being associated with the first IP address and the first port.

16. A non-transitory computer-readable storage medium including instructions that, when executed by at least one processor of a computing system, cause the computing system to perform a method comprising:
   initiating a robotics framework configured to enable inter-process communications between a plurality of services implemented on the robotics framework, the plurality of services configured to operate at least some features of a vehicle;
   receiving a function call from at least one device driver implemented as a first service of the plurality of services for instructing the robotics framework to generate a network socket;
   generating a virtual network socket that is based on the function call and configured to receive data associated with the plurality of services from a data log, wherein the function call specifies at least one type of the data to be received by the device driver and a callback function; and
   transmitting the at least one type of the data via the virtual network socket to the at least one device driver by using the callback function specified in the function call, wherein the virtual network socket simulates transmission of the at least one type of the data with a hardware device over a real network socket.

17. The non-transitory computer-readable storage medium of claim 16, wherein the function call comprises a first IP address and a first port.

18. The non-transitory computer-readable storage medium of claim 17, wherein the data log comprises a plurality of data transmissions from one or more sensors on a vehicle.

19. The non-transitory computer-readable storage medium of claim 18, wherein each data transmission in the plurality of data transmissions is associated with an IP address and a port.

20. The non-transitory computer-readable storage medium of claim 17, wherein the instructions, when executed by the at least one processor of the computing system, further cause the computing system to perform:
   identifying a first data transmission in the data log associated with the first IP address and the first port, and
   providing, via the robotics framework, the first data transmission to the at least one device driver implemented as the first service based on the first data transmission being associated with the first IP address and the first port.

* * * * *

UNITED STATES PATENT AND TRADEMARK OFFICE
CERTIFICATE OF CORRECTION

PATENT NO. : 11,076,022 B2
APPLICATION NO. : 16/237351
DATED : July 27, 2021
INVENTOR(S) : Tirthkumar Nilaykumar Pandya, Siliang Li and Jonathan Oliver Nichols Page 1 of 1

It is certified that error appears in the above-identified patent and that said Letters Patent is hereby corrected as shown below:

In the Specification

In Column 5, Line 14, replace "and/or or" with -- and/or --.

In the Claims

In Column 12, Line 17, In Claim 15, replace "claim 14" with -- claim 12 --.

Signed and Sealed this
Fourteenth Day of December, 2021

Drew Hirshfeld
*Performing the Functions and Duties of the*
*Under Secretary of Commerce for Intellectual Property and*
*Director of the United States Patent and Trademark Office*